(12) United States Patent
Nesheim et al.

(10) Patent No.: US 10,766,010 B2
(45) Date of Patent: Sep. 8, 2020

(54) HIGH THROUGHPUT BRINE GENERATING SYSTEM

(71) Applicant: Henderson Products, Inc., Manchester, IA (US)

(72) Inventors: Gary Nesheim, Windsor, WI (US); Clay Hildreth, Noblesville, IN (US); Grant Nesheim, Windsor, WI (US); Peter Nelles, Windsor, WI (US)

(73) Assignee: HENDERSON PRODUCTS, INC., Manchester, IA (US)

( * ) Notice: Subject to any disclaimer, the term of this patent is extended or adjusted under 35 U.S.C. 154(b) by 0 days.

(21) Appl. No.: 13/656,412

(22) Filed: Oct. 19, 2012

(65) Prior Publication Data

US 2013/0099155 A1 Apr. 25, 2013

Related U.S. Application Data

(60) Provisional application No. 61/549,504, filed on Oct. 20, 2011.

(51) Int. Cl.
| | |
|---|---|
| *B01D 11/02* | (2006.01) |
| *B01F 5/10* | (2006.01) |
| *B01F 1/00* | (2006.01) |
| *C09K 3/18* | (2006.01) |

(52) U.S. Cl.
CPC .............. *B01F 5/10* (2013.01); *B01F 1/0033* (2013.01); *C09K 3/18* (2013.01); *C09K 3/185* (2013.01); *Y10T 137/4891* (2015.04)

(58) Field of Classification Search
CPC ...... B01F 15/0202; B01F 5/10; B01F 1/0033; C09K 3/18; Y10T 137/4891

USPC ...................... 137/268, 1; 422/264, 269, 275
See application file for complete search history.

(56) References Cited

U.S. PATENT DOCUMENTS

| | | | |
|---|---|---|---|
| 409,234 | A | 8/1889 | Quinn |
| 1,928,859 | A | 10/1933 | Kutscha |
| 2,122,900 | A | 7/1938 | Uhrmacher |
| 2,270,372 | A | 5/1940 | Hunter |

(Continued)

FOREIGN PATENT DOCUMENTS

| | | |
|---|---|---|
| EP | 0470940 | 5/1995 |
| WO | WO 0051944 | 9/2000 |
| WO | WO 2000051944 | 9/2000 |

OTHER PUBLICATIONS

Cargill Deicing Technology, "Keep Roads Safer by Staying Ahead of the Storm," AccuBrine™ Brochure, May 10, 2011.

(Continued)

*Primary Examiner* — Kevin L Lee
(74) *Attorney, Agent, or Firm* — Leydig, Voit & Mayer, Ltd.

(57) ABSTRACT

A brine generation system includes a tank having an upper opening configured for receiving salt crystals to fill the tank. A divider separates a tank volume into an upper portion adapted for holding salt crystals a lower portion adapted for holding a brine solution. The divider is adapted to resist movement of salt crystals into the lower portion but is permeable to allow the brine solution to fall into the lower portion. A fluid conduit disposed within the upper portion includes at least one water jet for injecting water in a direction towards the salt crystals. The tank further includes an outlet positioned in the lower portion of the tank for withdrawing brine.

18 Claims, 4 Drawing Sheets

(56) References Cited

U.S. PATENT DOCUMENTS

| | | | |
|---|---|---|---|
| 2,281,140 A | 5/1941 | Courthope et al. | |
| 2,260,466 A | 4/1942 | Black | |
| 2,395,258 A | 8/1942 | Drake | |
| 2,533,772 A | 12/1950 | DeFrees | |
| 2,551,494 A | 5/1951 | Kaufmann | |
| 2,734,804 A | 2/1956 | Courthope et al. | |
| 3,168,379 A | 12/1957 | Miller | |
| 3,036,896 A | 5/1962 | Mackinnon | |
| 3,236,527 A | 9/1962 | Snyder | |
| 3,073,607 A | 1/1963 | Christy | |
| 3,190,726 A * | 6/1965 | Rudelick | 137/268 |
| 3,227,524 A | 1/1966 | White | |
| 3,307,914 A | 3/1967 | Heiss et al. | |
| 3,343,919 A | 9/1967 | Miller | |
| 3,372,995 A | 3/1968 | Ryan | |
| 3,385,674 A | 5/1968 | Kolasinski | |
| 3,574,559 A | 7/1968 | Kryzer et al. | |
| 3,401,890 A | 9/1968 | Middlesworth | |
| 3,420,451 A | 1/1969 | Kahlbacher | |
| 3,595,438 A | 7/1971 | Daley et al. | |
| 3,684,457 A | 8/1972 | Pinto et al. | |
| 3,800,026 A | 3/1974 | Morgan | |
| 3,936,274 A | 2/1976 | Leverenz et al. | |
| 3,946,753 A * | 3/1976 | Tischler | 137/268 |
| 3,987,808 A | 10/1976 | Carbonell et al. | |
| 4,026,673 A * | 5/1977 | Russo | 422/278 |
| 4,026,801 A | 5/1977 | Ward | |
| 4,031,912 A | 6/1977 | Lu et al. | |
| 4,115,270 A * | 9/1978 | Phillips | 137/268 |
| 4,116,640 A | 9/1978 | Leverenz | |
| 4,121,300 A | 10/1978 | Cosma et al. | |
| 4,161,280 A | 7/1979 | Kasinskas | |
| 4,166,581 A | 9/1979 | Hetrick | |
| 4,212,545 A | 7/1980 | Lovasz et al. | |
| 4,230,280 A | 10/1980 | Leigh et al. | |
| 4,247,298 A | 1/1981 | Rippie | |
| 4,261,520 A | 4/1981 | Hetrick | |
| 4,315,602 A | 2/1982 | Kubacak et al. | |
| 4,379,125 A | 4/1983 | Benninger et al. | |
| 4,403,866 A | 9/1983 | Falcoff et al. | |
| 4,433,917 A | 2/1984 | Mendel | |
| 4,442,979 A | 4/1984 | Kupper | |
| 4,448,682 A | 5/1984 | Moritz | |
| 4,474,476 A | 10/1984 | Thomsen | |
| 4,483,357 A | 11/1984 | Rao et al. | |
| 4,533,254 A | 8/1985 | Cook | |
| 4,784,495 A | 11/1988 | Jonsson et al. | |
| 4,858,449 A | 8/1989 | Lehn | |
| 4,863,277 A | 9/1989 | Neal et al. | |
| 4,877,522 A | 10/1989 | Toei et al. | |
| 4,976,377 A | 12/1990 | Higuchi et al. | |
| 5,069,392 A | 12/1991 | Wise et al. | |
| 5,096,125 A | 3/1992 | Wise et al. | |
| 5,133,848 A | 7/1992 | Meyers | |
| 5,137,694 A * | 8/1992 | Copeland et al. | 137/268 |
| 5,169,406 A | 12/1992 | Tewari | |
| 5,186,396 A | 2/1993 | Wise et al. | |
| 5,267,696 A | 12/1993 | Balmer | |
| 5,310,113 A | 5/1994 | Cowgur | |
| 5,318,226 A | 6/1994 | Kime et al. | |
| 5,344,231 A | 9/1994 | Jonsson et al. | |
| 5,460,446 A | 10/1995 | Chevallet et al. | |
| 5,476,320 A | 12/1995 | Taguchi et al. | |
| 5,501,403 A | 3/1996 | van Vooren | |
| 5,505,223 A * | 4/1996 | Rings et al. | 137/268 |
| 5,515,623 A | 5/1996 | Weeks | |
| 5,522,660 A | 6/1996 | O'Dougherty et al. | |
| 5,590,960 A | 1/1997 | Clinton et al. | |
| 5,647,391 A | 7/1997 | Chan et al. | |
| 5,653,389 A | 8/1997 | Henderson et al. | |
| 5,653,567 A | 8/1997 | Taylor | |
| 5,690,820 A | 11/1997 | Becnel, Jr. et al. | |
| 5,772,389 A | 6/1998 | Feller | |
| 5,800,056 A | 9/1998 | Suzuki et al. | |
| 5,800,506 A | 9/1998 | Perouse | |
| 5,819,776 A * | 10/1998 | Kephart | 137/1 |
| 5,874,049 A | 2/1999 | Ferri, Jr. et al. | |
| 5,881,639 A | 3/1999 | Nesheim et al. | |
| 5,904,296 A | 5/1999 | Doherty et al. | |
| 5,911,363 A | 6/1999 | Oligschlaeger | |
| 5,931,393 A | 8/1999 | Alsip et al. | |
| 5,964,410 A | 10/1999 | Brown et al. | |
| 5,980,836 A | 11/1999 | Moffett et al. | |
| 5,988,535 A | 11/1999 | Kime | |
| 5,992,437 A | 11/1999 | Takasaki et al. | |
| 6,048,391 A | 4/2000 | De Valk et al. | |
| 6,049,391 A | 4/2000 | Farrell | |
| 6,062,723 A | 5/2000 | de Valk et al. | |
| 6,068,200 A | 5/2000 | Kime | |
| 6,089,478 A | 7/2000 | Truan et al. | |
| 6,120,175 A | 9/2000 | Tewell | |
| 6,123,276 A | 9/2000 | Ungerer et al. | |
| 6,173,904 B1 | 1/2001 | Doherty et al. | |
| 6,179,230 B1 | 1/2001 | Geroux et al. | |
| 6,220,532 B1 | 4/2001 | Manon | |
| 6,231,763 B1 | 5/2001 | Chau | |
| 6,270,020 B1 | 8/2001 | Thompson et al. | |
| 6,308,900 B2 | 10/2001 | Geroux et al. | |
| 6,331,255 B1 | 12/2001 | Peddicord | |
| 6,354,786 B1 | 3/2002 | Feller | |
| 6,382,523 B1 | 5/2002 | Hedegard | |
| 6,394,735 B2 | 5/2002 | Hollinrake et al. | |
| 6,439,252 B1 | 8/2002 | Kephart | |
| 6,446,879 B1 | 9/2002 | Kime | |
| 6,451,270 B1 * | 9/2002 | Killian et al. | 422/261 |
| 6,468,481 B1 | 10/2002 | Anderson | |
| 6,517,281 B1 | 2/2003 | Rissi | |
| 6,585,472 B2 | 7/2003 | Hollinrake et al. | |
| 6,736,153 B1 | 5/2004 | Kime | |
| 6,761,525 B2 | 7/2004 | Hollinrake et al. | |
| 6,786,435 B2 | 9/2004 | Mishra | |
| 6,845,298 B2 | 1/2005 | Nelson et al. | |
| 6,881,022 B2 | 4/2005 | Feller | |
| 6,938,829 B2 | 9/2005 | Doherty et al. | |
| 6,945,482 B2 | 9/2005 | Hollinrake et al. | |
| 6,962,657 B2 | 11/2005 | Jordan et al. | |
| 6,966,688 B2 | 11/2005 | Lins | |
| 6,969,190 B1 | 11/2005 | McClain | |
| 7,014,715 B2 | 3/2006 | Kim | |
| 7,087,162 B2 | 8/2006 | Peddicord | |
| 7,108,196 B2 | 9/2006 | Kime | |
| 7,168,844 B2 | 1/2007 | Hoerle et al. | |
| 7,186,390 B1 | 3/2007 | Hellbusch et al. | |
| 7,261,819 B2 | 8/2007 | Jordan et al. | |
| 7,363,114 B2 | 4/2008 | Anderson et al. | |
| 7,438,827 B2 | 10/2008 | Hoerle et al. | |
| 7,461,969 B2 | 12/2008 | Hoerle et al. | |
| 7,461,971 B2 | 12/2008 | Hoerle et al. | |
| 7,582,205 B1 | 9/2009 | Fiscella, Jr. | |
| 7,628,847 B2 | 12/2009 | Pope et al. | |
| 7,758,769 B2 | 7/2010 | Sheen et al. | |
| 7,803,335 B1 | 9/2010 | Cope | |
| 7,810,987 B2 | 10/2010 | Hildreth | |
| 7,905,653 B2 | 3/2011 | Wilmer et al. | |
| 8,128,897 B2 | 3/2012 | Gimelfarb et al. | |
| 8,251,569 B2 | 8/2012 | Hildreth | |
| 8,382,364 B2 | 2/2013 | Hildreth | |
| 8,852,662 B2 | 10/2014 | Nesheim et al. | |
| 8,870,444 B2 | 10/2014 | Hildreth | |
| 9,156,013 B2 | 10/2015 | Hildreth | |
| 2002/0056376 A1 | 5/2002 | Abler | |
| 2003/0034406 A1 | 2/2003 | Mishra | |
| 2003/0161709 A1 | 8/2003 | Musso et al. | |
| 2003/0168535 A1 | 9/2003 | Hollinrake et al. | |
| 2004/0052164 A1 | 3/2004 | Smith et al. | |
| 2004/0057334 A1 | 3/2004 | Wilmer et al. | |
| 2006/0255061 A1 | 11/2006 | Frieze | |
| 2006/0266853 A1 | 11/2006 | Gamble, II et al. | |
| 2007/0025179 A1 | 2/2007 | Hildreth | |
| 2009/0008598 A1 | 1/2009 | Hoerle et al. | |
| 2009/0092001 A1 | 4/2009 | Hildreth et al. | |
| 2009/0136330 A1 | 5/2009 | Feller | |
| 2009/0155914 A1 | 6/2009 | Hildreth | |
| 2009/0173800 A1 | 7/2009 | Perkes | |

(56) References Cited

U.S. PATENT DOCUMENTS

| | | |
|---|---|---|
| 2010/0329071 A1 | 12/2010 | Hildreth |
| 2011/0104347 A1* | 5/2011 | Nelson .................. B01F 1/0033 |
| | | 426/321 |
| 2011/0315797 A1 | 12/2011 | Warchola |
| 2012/0043268 A1 | 2/2012 | Chen et al. |
| 2012/0051982 A1 | 3/2012 | Kois |
| 2012/0107470 A1 | 5/2012 | Nesheim |
| 2012/0269026 A1 | 10/2012 | Hildreth |
| 2013/0094324 A1 | 4/2013 | Hildreth et al. |
| 2014/0170276 A1 | 6/2014 | Nelles et al. |
| 2014/0251177 A1 | 9/2014 | Nesheim et al. |
| 2015/0273417 A1 | 10/2015 | Hildreth |
| 2016/0045877 A1* | 2/2016 | Truan et al. ............ B02C 13/02 |
| | | 106/13 |

OTHER PUBLICATIONS

Cargill Deicing Technology, "Automation Improves Brine Quality," AccuBrine™ Case History, 2008.
Cargill Deicing Technology, AccuBrine™ Automated Brine Maker, sellsheet, Apr. 2006.
Varitech Industries, Inc, "HCSB1400-SS Stainless Steel Brine Unit," Sales Brochure, 2009.

* cited by examiner

HIGH THROUGHPUT BRINE GENERATING SYSTEM

CROSS-REFERENCE TO RELATED APPLICATIONS FIELD

This patent application claims the benefit of priority to U.S. Provisional Patent Application No. 61/549,504, filed on Oct. 20, 2011, which is incorporated in its entirety herein by this reference.

TECHNICAL FIELD

This patent disclosure relates generally to systems for generating brine for the treatment of roadways in the winter and, more particularly, to a system and method for rapidly generating brine.

BACKGROUND

Brine, which is a combination of rock salt and water in an aqueous solution containing between 23% and 26% salt, is used for treating roadways during winter storms. When applied before the storm, brine can provide an anti-icing layer that prevents a bonding between the roadway and ice, facilitating ice and snow removal. The use of brine can often reduce the use of salt and sand, lessening environmental damage, and because it can be applied before the storm, may reduce labor costs by allowing road treatment during regular business hours.

Brine is currently prepared in tanks with open tops through which salt may be loaded. The salt is supported above the bottom of the tank by horizontal screens. Nozzles about the upper lip of the tank may then be used to spray water over the surface of the salt, the latter of which may percolate downward through the screens into the lower portion of the tank. The water may be collected at the bottom of the tank and recirculated one or more times through a second set of nozzles until the desired salinity is obtained. An example of this design is taught by U.S. Pat. No. 7,810,987, which issued on Oct. 12, 2010.

As noted in the above cited patent, the salt is often contaminated with dirt and silica which can be abrasive and can cause excess wear on pumps, flow meters, and valves in the delivery chain of the brine. Accordingly, these contaminants are allowed to settle in the tank at a point below the brine outlet. Cleaning the sediment from the tank can be facilitated by sloping the tank bottom to a sump channel leading to a sediment outlet in the tank. In use, the tank is drained (possibly without removal of the salt) and spray nozzles are used to force the sediment through the channel and out the sediment outlet.

Obtaining the necessary salinity using such systems can be significantly delayed by the time it takes to recirculate the brine for multiple passes through the salt. Cleaning the sediment from the tank is time-consuming and requires that the machine be drained and thus remain off-line for a significant period of time. Substantial sediment may accumulate in a few hours of operation, thus significantly affecting the throughput of the device.

SUMMARY

Embodiments of the present disclosure are directed to a high throughput brining system that immerses the freshwater nozzles in the salt near an obstructing divider to create an extreme erosion zone within the salt. This high turbulence zone can provide an accelerated entry of the salt into solution. In addition, the embodiments of a brine generating system according to principles of the present disclosure can provide sediment filtering that catches a significant portion of the sediment at a point above the bottom of the tank allowing the sediment to be automatically discharged periodically, without fully draining the tank and even during operation of the brining system. In this way, a full cleaning of the sump can be delayed, thereby increasing the up-time of the system.

In some embodiments, a brine generation system includes a tank with an upper opening configured for receiving salt crystals and a divider separating the tank into a salt crystal holding upper portion and a brine holding lower portion. The divider is adapted to resist movement of salt crystals from the upper portion to the lower portion but be permeable to allow the brine solution to fall into the lower portion from the upper portion through the divider. A fluid conduit is disposed within the upper portion. The fluid conduit includes at least one water jet adapted to inject a stream of water provided through the fluid conduit. The stream of water is configured for discharge through the water jet in a direction that is downward into the volume of the tank. An outlet is positioned in the lower portion of the tank for withdrawing the brine solution. In some embodiments, a set of water jets receives fresh water and discharges it downward into the tank at a point below an upper third of a volume of the upper salt crystal holding portion whereby the water jets may be surrounded by salt crystals.

In other embodiments, a brine generation system includes a tank having an upper opening for receiving salt crystals to fill the tank. A divider separates the tank into an upper salt crystal holding portion and a lower brine holding portion. The divider provides an intermediate channel positioned above the lower brine holding portion. The intermediate channel is adapted for accumulating non-soluble particles that may be mixed with the salt crystals by sedimentation. A set of water jets is disposed within the upper salt crystal holding portion of the tank. The set of water jets is adapted to discharge fresh water or a brine solution into the upper salt crystal holding portion to dissolve salt crystals. A mechanical sweeper is associated with the intermediate channel. The mechanical sweeper is adapted to collect and discharge non-soluble particles from the intermediate channel out of the tank through an opening extending through a wall of the tank. A lower channel is formed below the intermediate channel at a lower position in the lower brine holding portion. The lower channel is adapted for accumulating non-soluble particles found in a brine solution that percolates from the upper salt crystal holding portion when the set of water jets is active. A brine outlet extends through the wall of the tank at an outlet height. The outlet height is above the lower channel and below the intermediate channel. The brine outlet is adapted to withdraw brine solution from the lower portion of the tank.

It is a feature of at least one embodiment of a brine generating system according to principles of the present disclosure to substantially reduce the amount of extra-tank recirculation required to obtain a given degree of salinity.

In embodiments, a divider may include a wall portion adjacent to the water jets for providing a region of circulating water drivable by a force of water from the water jets. It is thus a feature of at least one embodiment of a brine generating system according to principles of the present disclosure to increase the dwell time of turbulent water and salt beyond the limit imposed by simple percolation.

In embodiments, a divider may include a sump channel and an openable port through the tank wall for ejection of particles accumulated in the sump channel. It is thus a feature of at least one embodiment of a brine generating system according to principles of the present disclosure to capture particulates at a point above the bottom of the tank permitting their ejection without full tank draining.

In embodiments, a sump channel may include a mechanical sweeper for moving collected particles off of the sump channel and out of the openable port in the tank. It is thus a feature of at least one embodiment of a brine generating system according to principles of the present disclosure to permit the ejection of sediment without dilution of existing brine.

In embodiments, a mechanical sweeper may be an auger extending substantially horizontally along the sump channel. It is thus a feature of at least one embodiment of a brine generating system according to principles of the present disclosure to provide a compact apparatus for mechanically removing sediment.

In embodiments, an auger and an openable port may be electronically controllable for automatic ejection of accumulating particles. It is thus a feature of at least one embodiment of a brine generating system according to principles of the present disclosure to allow optimization of the cycle of sediment removal for minimum downtime.

In embodiments, at least a portion of a sump channel forming a lowermost portion in a divider may be a screen. It is thus a feature of at least one embodiment of a brine generating system according to principles of the present disclosure to provide a system concentrating sediment for removal.

In embodiments, a valve plate may divide an upper portion into an upper erosion chamber receiving water directly from jets and a portion of a sump channel below the upper erosion chamber, a valve plate controlling passage of material from the upper erosion chamber to the lower sump channel. It is thus a feature of at least one embodiment of a brine generating system according to principles of the present disclosure to controllably limit drainage of brine through the sump to maximize sediment retention without adversely reducing dwell time of liquid in the extreme erosion zone.

In embodiments, a brine generation system may further include a second screen above and not covering a sump channel and presenting a substantially vertical surface to resist accumulation of particles. It is thus a feature of at least one embodiment of a brine generating system according to principles of the present disclosure to provide a decanting route for brine from the extreme turbulence zone.

In embodiments, a brine generation system may include a third screen covering a sump channel above a second screen passing larger particles than a second screen. It is thus a feature of at least one embodiment of a brine generating system according to principles of the present disclosure to block extremely large damaging particles such as rocks and sticks.

In embodiments, a brine generation system may further include a secondary sump at a lowermost portion of a tank below a sump channel for accumulating particles passing through a divider. It is thus a feature of at least one embodiment of a brine generating system according to principles of the present disclosure to permit removal of non-soluble particulates that escape the intermediate trap.

In embodiments, a port openable through a tank wall may provide for the ejection of particles accumulated by a secondary sump. It is thus a feature of at least one embodiment of a brine generating system according to principles of the present disclosure to allow simple removal of the fine particulates when the tank is drained.

In embodiments, a secondary sump may be a horizontally extending channel sloping along its length and further including an ejector for driving accumulated particles within a secondary sump out of an openable port. It is thus a feature of at least one embodiment of a brine generating system according to principles of the present disclosure to promote complete cleaning of the tank with reduced water usage.

In embodiments, an ejector comprises a pressurized water nozzle. It is thus a feature of at least one embodiment of a brine generating system according to principles of the present disclosure to provide a simple method of periodic cleaning that may occur after draining.

In another aspect of the present disclosure, embodiments of a method for generating a brine solution useful for treating roadways against ice accumulation thereon are described. In one embodiment, a tank that is segmented into upper and lower portions is provided. The upper portion is adapted for containing salt crystals, and the lower portion is adapted for containing the brine solution. One or more water jets operate within the upper portion when salt crystals are present in the upper portion. The water jets provide water streams aimed towards the salt crystals such that the water jets dissolve salt crystals to form the brine solution in the upper portion. The brine solution from the upper portion is allowed to percolate through a permeable divider that has a non-permeable section and that separates the upper and lower portions such that the brine solution is collected in the lower portion. The water jets operate such that at least a portion of the water streams impinges the non-permeable portion of the divider to create a turbulent region adapted to promote salt crystal dissolution. One or more screens are provided in the divider through which the brine solution passes such that any non-soluble particles present within the salt crystals can collect on at least one screen. A sweeper device adapted to collect non-soluble particles from the at least one screen and eject the collected non-soluble particles through an openable port extending through a wall of the tank is operated.

Further and alternative aspects and features of the disclosed principles will be appreciated from the following detailed description and the accompanying drawings. As will be appreciated, the brine generating systems and methods for using the same disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
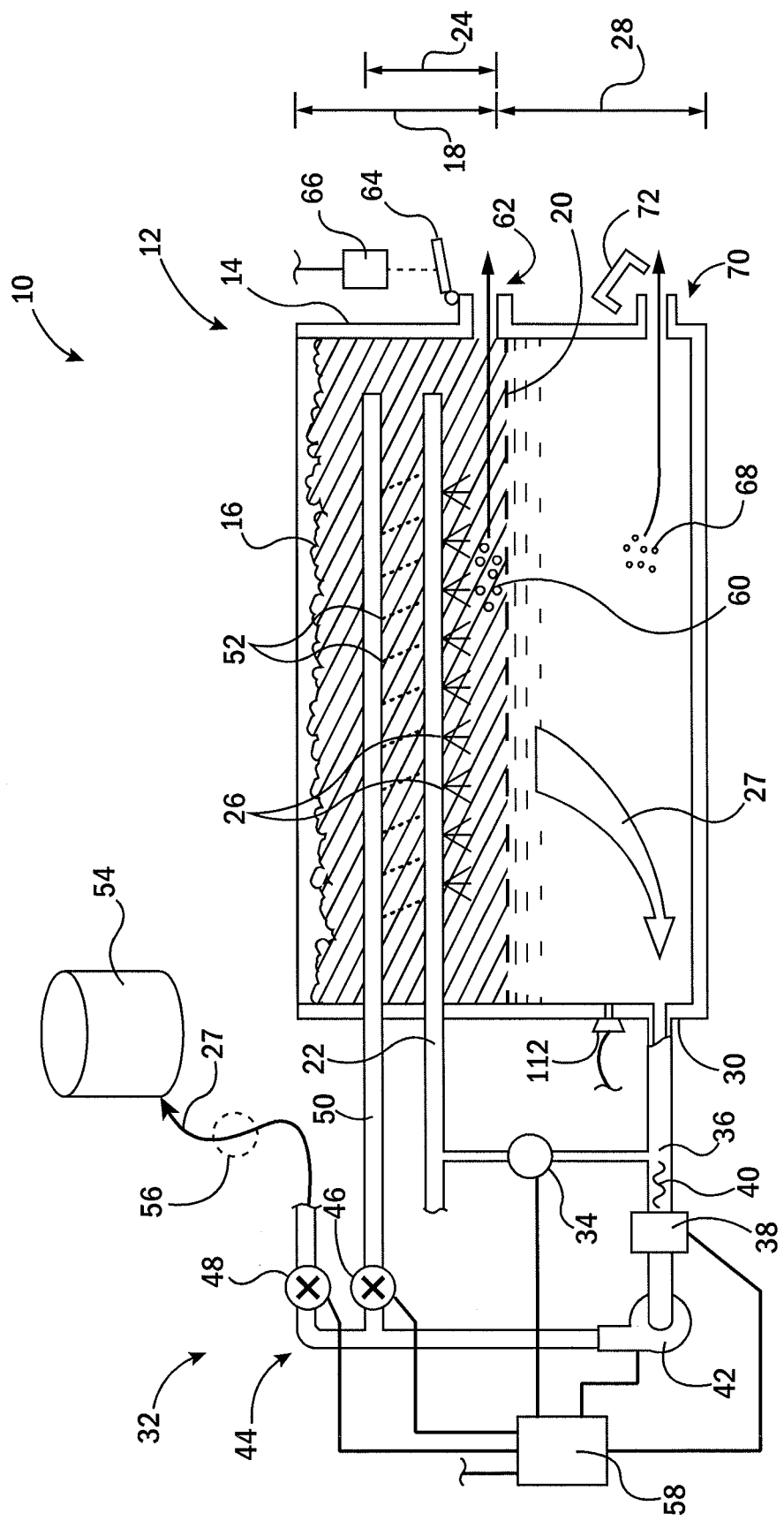
FIG. 1 is a simplified side elevational view in partial cross-section of an embodiment of a brining system constructed according to principles of the present disclosure showing a location of fresh water jets in an upper portion of the tank as buried in salt and close to a divider to create an extreme erosion zone near the divider and further showing two levels of sediment removal.

Referring now to FIG. 1, an embodiment of a brine generation system 10 constructed according to principles of the present disclosure can include a tank unit 12 providing a tank 14, for example, made of stainless steel and having an open top through which rock salt 16 or other similar material such as calcium magnesium acetate (CMA) pellets and other salt-containing materials that will dissolve in water (referred to herein, collectively, as "salt crystals" or "crystals of salt") can be received. In alternative embodiments, other non-corrosive materials such as fiberglass, polymers and the like can be used. An exemplary, but non-limiting, capacity of the tank 14 can be six to eight cubic yards.

As will be described in greater detail below, the salt 16 is generally contained in a salt-holding upper portion 18 as constrained by a divider 20. A freshwater source can feed a freshwater manifold 22 extending horizontally into the upper holding portion in an inflow region 24 below an upper third of the volume of the upper holding portion, such that the freshwater manifold 22 can be surrounded by crystals of salt 16. The manifold 22 provides a series of nozzles 26 discharging high-pressure streams of freshwater downward into the salt 16.

Brine 27 collects beneath the divider 20 in a brine-holding lower portion 28 of the tank 14 and can be extracted through brine extraction port 30 above the bottom of the tank 14 in a wall of the tank 14 and communicating with a brine conduit 36. The brine holding lower portion 28 can, for example, hold up to 380 gallons of brine. The brine 27 can be received by a salinity control system 32 which is adapted to adjust the brine for proper salinity.

Specifically, the salinity control system 32 is adapted to controllably mix the brine 27 as received from the brine extraction port 30 with freshwater from freshwater metering valve 34 communicating between the manifold 22 and a brine conduit 36. If the salinity is too high, as checked by a salinity sensor 38 downstream from freshwater inlet from the freshwater metering valve 34 after passing through a mixer 40 within the brine conduit 36, additional water can be added automatically. The salinity sensor 38 can be any suitable sensor adapted to allow a controller of the salinity control system 32 to determine the salinity of the brine, for example, an electrical salinity gauge providing accuracy of as much as 0.01% or a density sensor adapted to measure the density of the brine, which can be converted to a salinity concentration by a PLC.

The brine 27 measured by the salinity sensor 38 can be received by a pump 42 to pass to a valve bank 44 having a recycle valve 46 and the tank valve 48. The former valve 46 conducts the brine 27 to a return manifold 50 that can extend generally parallel to the freshwater manifold 22 but displaced therefrom in the inflow region 24. The return manifold 50 can include a series of orifices 52 which can be nozzles or simply low-pressure openings that return the brine 27 to the tank to increase its salinity.

Thus control of the freshwater metering valve 34 and the recycling provided by the valve 46 can be used to adjust the salinity of the brine 27 received by the pump 42. One or more flow sensors (not shown) can also be placed in the brine conduit 36, freshwater manifold 22 or return manifold 50 for further control input.

The valve 48, when open, can forward the brine to a storage tank 54 possibly by way of a mixing station 56, the latter which can mix the brine with other additives of types known in the art. Each of the valves 34, 46, 48, and the pump 42 can be electrically controlled by pneumatic valves controlled by a controller 58 (such as a programmable logic controller) for automatic operation as will be described herein, based on readings obtained from the salinity sensor 38, flow sensors (not shown) and inputs received from the operator in a control panel (also not shown).

The tank 14 provides for two stages of sediment collection. Such sediment includes non-soluble particles that can be mixed with the salt crystals loaded into the tank. A first stage of sedimentation collection occurs above the bottom of the tank near the divider 20 and provides for a capture of intermediate particulates 60 which can be automatically discharged through a port 62 at one end of the tank 14. The port 62 can have electronically controllable port hatch 64 controlled by an actuator 66 communicating with the controller 58 for automatic discharge of the intermediate particulates 60 at regular intervals.

Fine particulates 68 can settle to the bottom of the tank 14 and be discharged through a second discharge port 70 below the port 62. This port can have a manually removable cap or valve 71. The discharge ports 62 and 70 are shown on the same side of the tank for clarity; however, in a preferred embodiment, discharge port 70 is on the same side as the brine extraction port 30 preventing interference in the collection of sediment between the two ports.

Figure 2:
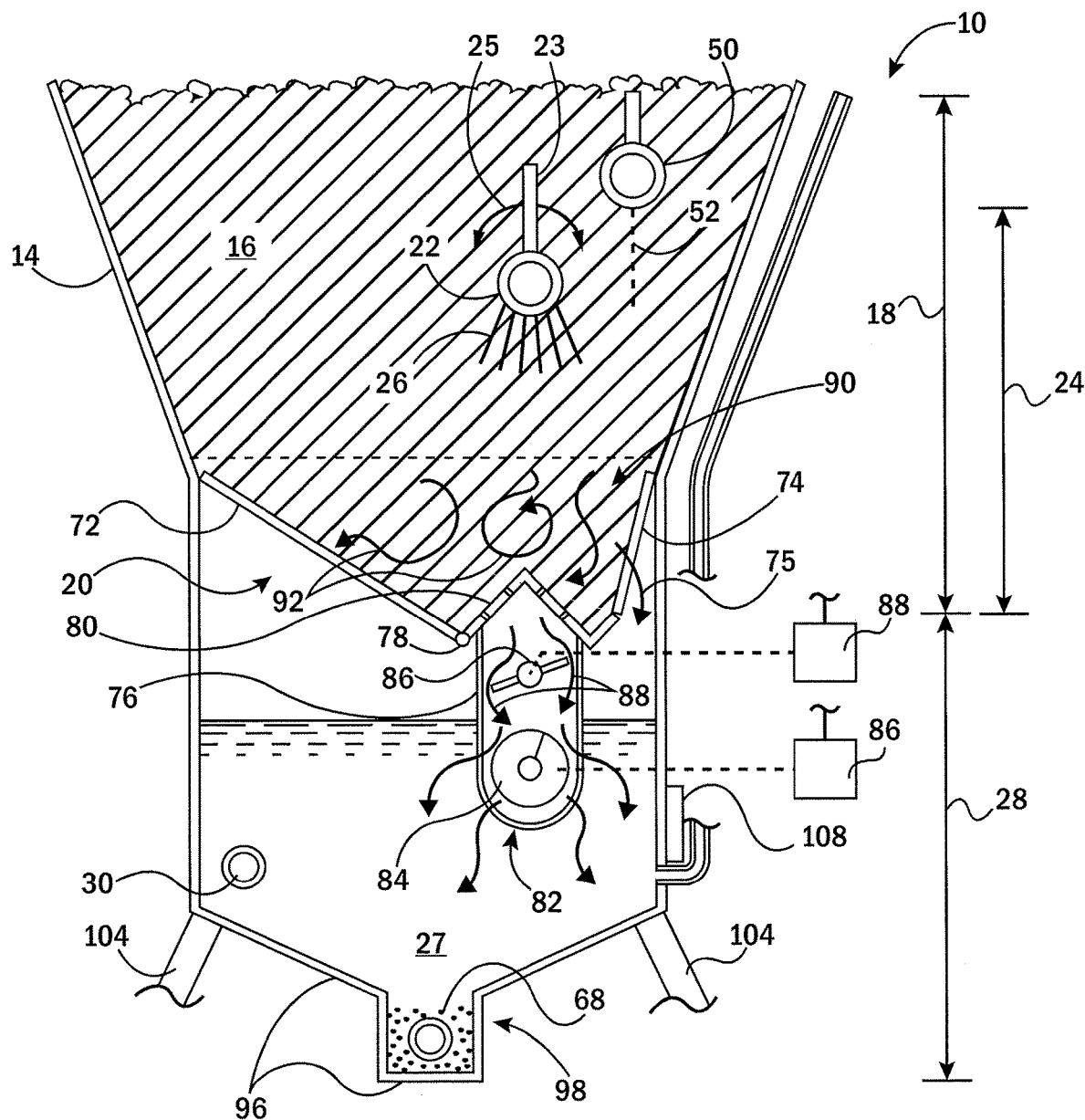
FIG. 2 is an elevational view in cross-section of the tank of FIG. 1 showing details of the divider for creating the extreme erosion zone and a first sediment collection sump for collecting sediment above the bottom of the tank and a second sediment collection zone at the bottom of the tank.

Referring now to FIG. 2, the upper portion of the tank 14 can flare outward to provide a hopper 73 for receiving salt 16 from a back loader, conveyor or the like as discharged downward into the tank 14. The salt 16 is then guided to the divider 20 which provides a first inwardly sloping wall 72 and opposed second inwardly sloping wall 74 converging in a downward direction to a sump channel 76. The first sloping wall 72 and second sloping wall 74 thereby approximate a V channel having the sump channel extending downward from its lower vertex. The first sloping wall 72 can be hinged about a hinge point 78 allowing its outer edge to be raised away from a wall of the tank 14 for access to the lower portion 28 of the tank 14 when salt 16 is removed. The second sloping wall 74 provides generally a screen that is permeable to liquid, allowing the latter to pass generally horizontally therethrough as indicated by arrow 75 but resisting the passage of the larger salt particles. This screen can have, for example, 5/32 inch (4 mm) holes staggered on a 3/16 inch (4.75 mm) grid. The vertical extent of the screen of wall 74 helps resist the accumulation of particulate matter against the screen, as the particulate matter migrates generally downward toward the sump channel 76.

Figure 3:
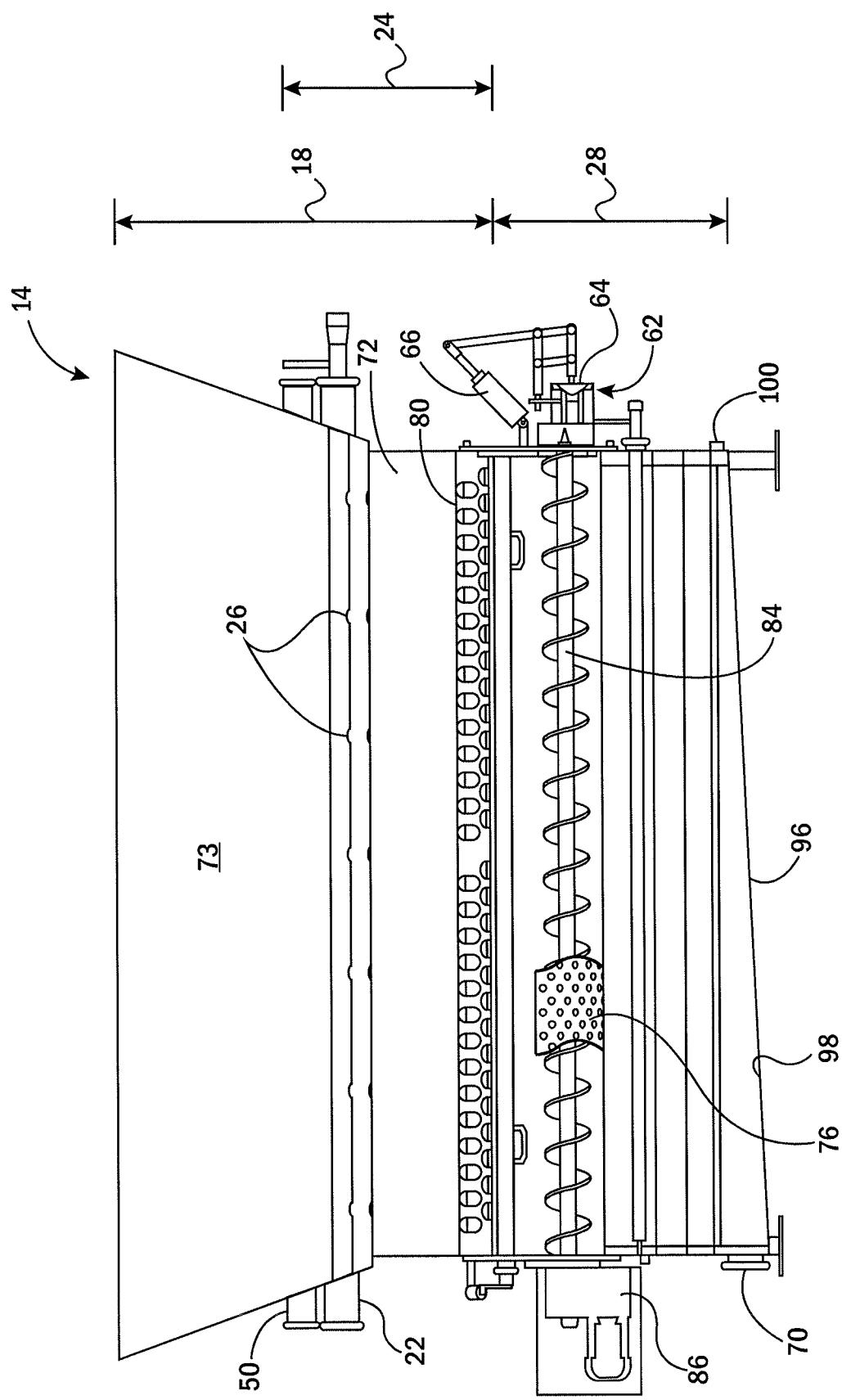
FIG. 3 is a detailed side elevational view similar to FIG. 1 showing an auger of the first sump for automatically removing material therefrom and a rock and stick filter positioned above the first sediment collection sump.

Referring also to FIG. 3, an upper open end of the sump channel 76 communicating with the upper portion 18 can be covered by a rock guard 80 having relatively large openings (on the order of 2 inch (50 mm) diameters) intended to prevent passage of large rocks or sticks or the like into the sump channel 76.

Referring to FIGS. 2 and 3, the walls of the sump channel 76 can be formed of a perforated sheet of stainless steel formed in an upwardly facing U-shaped cross-section to provide a radiused portion 82 conforming to an outer periphery of a horizontally extending auger 84. The perforations will generally have similar openings to the openings of the screen of the second sloping wall 74, both of which can be much smaller than the openings of the rock guard 80. The auger 84 can be a screw type helix having a cylindrical swept volume formed of molded polypropylene or stainless steel sections assembled on a stainless steel arbor. Rotation of the auger 84 by a gear motor 87 (electronically controllable by the controller 58 shown in FIG. 1) scrapes the inner surface of the radiused portion 82 to transport sediment trapped by the sump channel 76 out of the port 62 when port hatch 64 is opened. It will be appreciated that this operation of the auger 84 can be conducted without a complete draining of the tank 14 of brine 27. When significant sediment has accumulated in the sump channel 76, the auger 84 can be operated even with the level of the brine 27 slightly above the auger 84 without undue loss of brine through the port 62. This allows continued operation of the system 10 without the need to drain the tank and go off-line while substantially decreasing the amount of sediment that will accumulate at the bottom of the tank.

Referring still to FIG. 2, positioned within the sump channel 76 and above the auger 84 is a plate valve 86 controllable by actuator 88 that can also be controlled by controller 58 (shown in FIG. 1). The plate valve 86, when closed, substantially blocks access to the sump channel 76 from above the divider 20 allowing more access as the plate valve 86 is opened. The result is that the amount of fluid flow indicated by arrows 89 from the upper portion 18 of the chamber into the sump channel 76 can be controlled to permit the collection of intermediate size particulates 60 in the sump channel 76 without providing substantial loss of brine therethrough. The result of the placement of the nozzles 26 of the freshwater manifold 22 adjacent to the divider 20 is to create an extreme erosion zone 90 providing for highly turbulent flow 92 within a pool 94 of brine 27 above the divider 20. The angle of the nozzles 26 can be adjusted about an axis of the manifold 22 via exterior handle 23 as indicated by arrows 25. By control of the relative flow through the nozzles 26 and the setting of the plate valve 86, the dwell-time for liquid above the divider 20 can be controlled allowing desired salinity to be obtained with reduced need to recirculate the brine through the system which can decrease the rate at which the system can produce the brine solution. In the illustrated embodiment, the system is configured to provide at least exceed 100 gallons (380 L) of brine solution per minute.

Referring still to FIGS. 2 and 3, a bottom wall 96 of the tank 14 can provide for an upwardly open channel 98 being a lowermost portion of the bottom wall 96. Bottom wall 96 outside of the channel 98 can slope toward the channel to facilitate the collection of fine particulates 68 therein. The channel 98 itself slopes downward toward the exit port 70 at one end of the tank 14 to facilitate the migration of fine sediment toward the exit port 70. A port 100 opposite the port 70 across the channel 98 can provide for the introduction of high-pressure water through a nozzle to force sediment along the channel 98 out of the port 70. Additional manifolds and nozzles (not shown in FIG. 2) can direct water jets down the slope portions of the bottom wall 96 outside of channel 98 to assist in this discharge process. This sediment removal process typically requires draining of the tank from brine 27 and thus is desirably performed less frequently than operation of the auger 84 described above.

Figure 4:
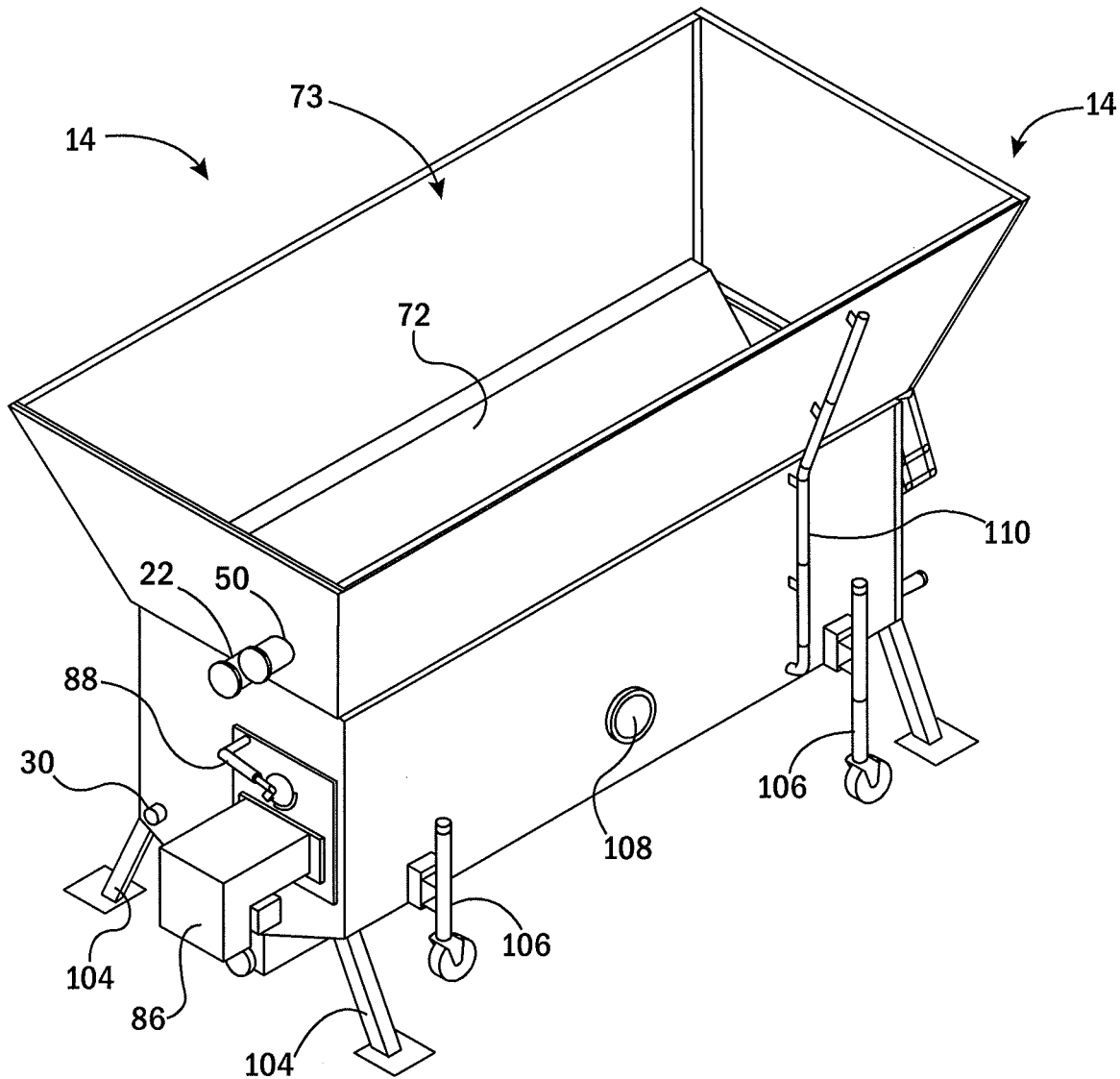
FIG. 4 is a perspective view of an embodiment of a tank constructed according to principles of the present disclosure showing relative locations of a freshwater manifold and recirculation manifold.

Referring now to FIG. 4, the tank 14 can be supported on outwardly splayed legs 104 fixedly attached to the bottom wall 96. Retractable caster units 106 can be lowered to allow movement of the tank by lifting it from a surface in contact with the legs 104. A clear viewport 108 is provided in one side of the tank approximately on level with the brine extraction port 30 to allow monitoring of the sediment buildup of fine particulates 68. A clear, sight-tube type water height gauge 110 can be placed on the side of the tank 14 showing a brine level height in the lower portion 28. This water height gauge 110 can be augmented by a pressure sensor type water height gauge 112 (shown in FIG. 1 communicating with the controller 58) to allow automatic adjustment and control of the brine height in the lower portion 28

During operation, the controller 58 can adjust the salinity of the brine discharged to the tanks 54 and periodically run the auger 84, possibly with adjustment of the brine level downward below the port hatch 64, per water height gauge 112, before such auger runs. A feedback control loop (for example implementing a PID loop) can be used to control the plate valve 86 to minimize the need for recycling brine through return manifold 50 increasing the net throughput of the device.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," and "side" describe the orientation of portions of the component within a consistent but arbitrary frame of reference which is made clear by reference to the text and the associated drawings describing the component under discussion. Such terminology can include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A brine generation system comprising:
   a tank having an upper opening configured for receiving salt crystals therethrough into the tank;
   a divider separating a volume within the tank into an upper portion, which is adapted for holding salt crystals, and a lower portion, which is adapted for holding a brine solution, wherein the divider is adapted to resist movement of salt crystals therethrough but be permeable to allow the brine solution to fall into the lower portion from the upper portion through the divider, wherein the divider includes a sump channel adapted to collect non-soluble particles present in the salt crystals, and wherein the sump channel is in communication with an openable port extending through a wall of the tank;
   a fluid conduit disposed within the upper portion, the fluid conduit including at least one water jet adapted to inject a stream of water provided through the fluid conduit, the stream of water configured for discharge through the water jet in a direction that is downward into the volume of the tank; and
   an outlet positioned in the lower portion of the tank for withdrawing the brine solution;
   wherein the upper portion defines an upper volume and wherein the at least one water jet is positioned within the lower two thirds of the upper volume such that the at least one water jet is substantially surrounded by salt crystals when the upper portion of the tank is full with salt crystals.

2. The brine generation system of claim 1, wherein the divider includes a non-permeable wall portion that is disposed adjacent to the at least one water jet, the non-permeable wall portion adapted to provide a turbulence region of circulating water drivable by a force of the stream of water when the brine generation system is operating.

3. The brine generation system of claim 1, further comprising:
   a mechanical sweeper associated with the sump channel, the mechanical sweeper adapted for collecting the non-soluble particles from the sump channel and for pushing the non-soluble particles out of the tank through the openable port.

4. The brine generation system of claim 3, wherein the sump channel has an elongate shape extending along a major dimension of the tank, wherein the mechanical sweeper is an auger extending along the sump channel and adapted to push the non-soluble particles towards an ejection end of the sump channel, and wherein the openable port is disposed adjacent the ejection end.

5. The brine generation system of claim 1, wherein at least a portion of the sump channel is disposed along a lowermost portion of the divider, and wherein the lowermost portion of the divider includes a first screen that is permeable to the brine solution.

6. The brine generation system of claim 5, wherein the upper portion defines an erosion chamber disposed above the sump channel, and wherein the brine generation system further comprises a valve plate disposed between the erosion chamber and the sump channel, the valve plate being moveable between positions adapted to control passage of material from the erosion chamber to the sump channel, the material including non-soluble particles and salt crystals.

7. The brine generation system of claim 5, further comprising:
   a second screen disposed above and at a distance relative to an opening of the sump channel, the second screen presenting a substantially vertical surface adapted to resist accumulation of non-soluble particles thereon.

8. The brine generation system of claim 7, further comprising:
   a third screen covering the sump channel above the first screen, the third screen having openings adapted for passing larger particles through the third screen than the second screen.

9. The brine generation system of claim 2, wherein the lower portion forms a secondary sump at a lowermost portion of the tank, the secondary sump disposed below the sump channel and adapted for accumulating non-soluble particles that may enter the lower portion.

10. The brine generation system of claim 9, further comprising a secondary port that is openable through a wall of the tank and is adapted to provide an outlet for ejection of nonsoluble particles from the secondary sump.

11. The brine generation system of claim 10, wherein the secondary sump includes:
    a channel that extends horizontally along a major dimension of the tank, the channel sloping along its length; and
    an ejector disposed in the channel and configured for collecting non-soluble particles collected by sedimentation within the channel, and ejecting at least a portion of the non-soluble particles out of the channel through the secondary port.

12. The brine generation system of claim 11, wherein the ejector is a high-pressure water nozzle adapted to provide a pressurized water stream along the channel, wherein the water stream is adapted to flush the non-soluble particles collected in the channel out of the tank through the secondary port when the secondary port is in an open position.

13. A brine generation system comprising:
    a tank having an upper opening for receiving salt crystals to fill the tank;
    a divider separating the tank into an upper salt crystal holding portion and a lower brine holding portion, the divider providing an intermediate channel positioned above the lower brine holding portion, the intermediate channel adapted for accumulating nonsoluble particles that may be mixed with the salt crystals by sedimentation;
    a set of water jets disposed within the upper salt crystal holding portion of the tank, the set of water jets adapted to discharge fresh water or a brine solution into the upper salt crystal holding portion to dissolve salt crystals;
    a mechanical sweeper associated with the intermediate channel, the mechanical sweeper adapted to collect and discharge non-soluble particles from the intermediate channel out of the tank through an opening extending through a wall of the tank;

a lower channel formed below the intermediate channel at a lower position in the lower brine holding portion, the lower channel adapted for accumulating non-soluble particles found in a brine solution that percolates from the upper salt crystal holding portion when the set of water jets is active; and a brine outlet extending through the wall of the tank at an outlet height, the outlet height being above the lower channel and below the intermediate channel;

wherein the brine outlet is adapted to withdraw brine solution from the lower portion of the tank.

14. The brine generation system of claim 13, wherein the divider includes a non-permeable wall portion disposed adjacent to the set of water jets, the non-permeable wall portion adapted for providing a surface onto which water streams from the set of jets can impinge and thus create a turbulence region adapted to promote dissolution of the salt crystals.

15. The brine generation system of claim 13, wherein the divider includes a first screen positioned above a second screen, the first and second screens having differently sized openings adapted to collect differently sized non-soluble particles, and wherein the tank further includes an openable port extending through the wall of the tank and adapted to provide an opening for evacuation from the tank of non-soluble particles collected by the second screen.

16. The brine generation system of claim 15, wherein the first screen presents a substantially vertical surface to resist accumulation of non-soluble particles thereon.

17. A method for generating a brine solution useful for treating roadways against ice accumulation thereon, the method comprising:

providing a tank that is segmented into upper and lower portions, the upper portion adapted for containing salt crystals, and the lower portion adapted for containing the brine solution;

operating one or more water jets within the upper portion when salt crystals are present in the upper portion, the water jets providing water streams aimed towards the salt crystals such that the water jets dissolve salt crystals to form the brine solution in the upper portion;

allowing the brine solution from the upper portion to percolate through a permeable divider that has a non-permeable section and that separates the upper and lower portions such that the brine solution is collected in the lower portion;

operating the water jets such that at least a portion of the water streams impinges the nonpermeable portion of the divider to create a turbulent region adapted to promote salt crystal dissolution;

providing one or more screens in the divider through which the brine solution passes such that any non-soluble particles present within the salt crystals can collect on at least one screen; and operating a sweeper device adapted to collect non-soluble particles from the at least one screen and eject the collected non-soluble particles through an openable port extending through a wall of the tank.

18. The method of claim 17, wherein the one or more screens includes two screens having different openings such that non-soluble particles of different sizes may be collected and removed separately.

* * * * *